United States Patent
Janik et al.

(10) Patent No.: US 10,462,865 B1
(45) Date of Patent: Oct. 29, 2019

(54) DIMMING CONTROL OF LIGHTING MODULES

(71) Applicant: Eaton Intelligent Power Limited, Dublin (IE)

(72) Inventors: Raymond George Janik, Fayetteville, GA (US); Russell Trask, Sharpsburg, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/175,448

(22) Filed: Oct. 30, 2018

(51) Int. Cl.
  *H05B 33/08* (2006.01)
  *H05B 37/02* (2006.01)
(52) U.S. Cl.
  CPC ..... *H05B 33/0845* (2013.01); *H05B 33/0896* (2013.01); *H05B 33/0815* (2013.01)
(58) Field of Classification Search
  None
  See application file for complete search history.

(56) References Cited

U.S. PATENT DOCUMENTS 9,474,111 B2 * 10/2016 Harris ............... H05B 33/0815

* cited by examiner

*Primary Examiner* — Dedei K Hammond
(74) *Attorney, Agent, or Firm* — King & Spalding LLP

(57) ABSTRACT

A lighting fixture includes a voltage source circuit and a first light module comprising a first current source circuit and a first light emitting diode (LED) light source. The lighting fixture further includes a second light module that includes a second current source circuit and a second LED light source. The voltage source circuit is configured to provide a voltage source output voltage to the first current source circuit and to the second current source circuit. The first current source circuit is configured to provide a first current to the first LED light source. The second current source circuit is configured to provide a second current to the second LED light source. A voltage level of the voltage source output voltage depends on a waveform of a line dimmer output voltage that is provided to the voltage source circuit.

20 Claims, 9 Drawing Sheets

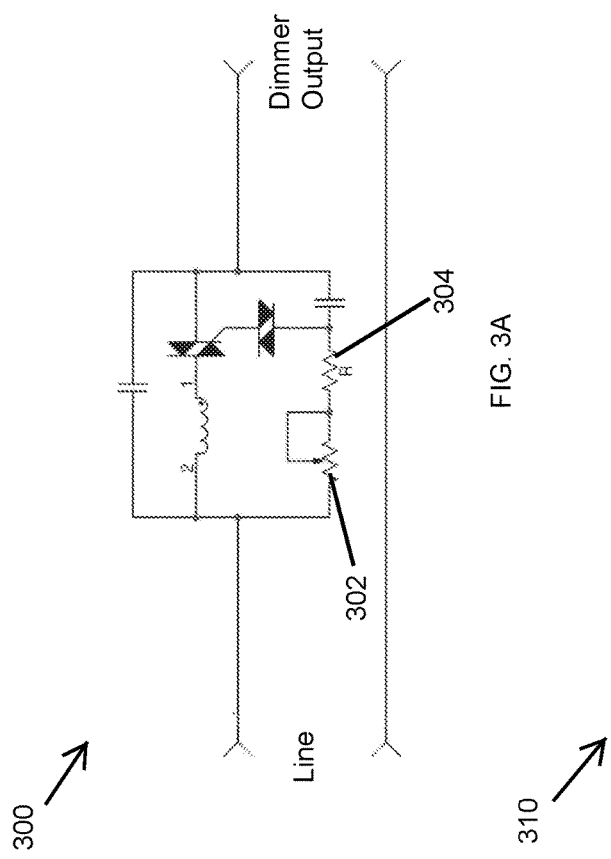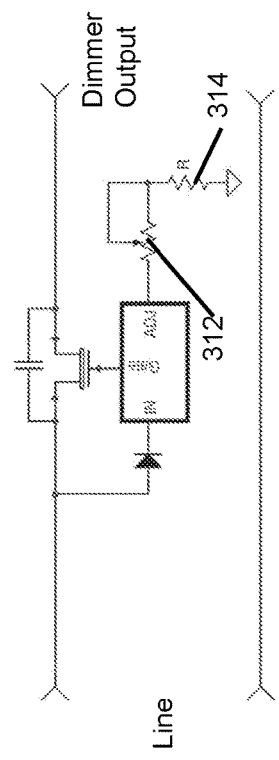
FIG. 3A
FIG. 3B

DIMMING CONTROL OF LIGHTING MODULES

TECHNICAL FIELD

The present disclosure relates generally to lighting solutions, and more particularly to dimming control of lighting modules of lighting fixtures and lighting systems.

BACKGROUND

A driver (e.g., an LED driver) is often used to provide power to the light sources of a lighting device. In some applications, a dimmer may be used to control the power that is provided by the driver to a light source to control the intensity of light emitted by a light source. For example, a phase-cut dimmer or a 0-10 volt dimmer may be used to control the dim level of light emitted by a light emitting diode ("LED") light source.

In some applications, a lighting fixture may include multiple light modules that each include a respective light source. Typically, a single current source (e.g., an LED driver) is used to drive multiple light modules of a lighting fixture in parallel. When a replacement light module or a new light module is added to a lighting fixture, or in a configurable lighting fixture where the user can add or remove modules, the driver may need to be replaced or re-programmed to provide an output current such that the current provided to each light module is maintained at a desired level. Further, when a light module is removed from a lighting fixture, the current that was previously provided to the now removed light module is distributed among the remaining light modules, which can result in undesired increase in light intensity or in damage to the light modules. Malfunctions and failures can result when excessive current is provided to the light modules of a lighting fixture. Thus, a solution that allows light modules to operate independent of the number of modules in a lighting fixture or a lighting system may be desirable.

SUMMARY

The present disclosure relates generally to lighting solutions, and more particularly to dimming control of lighting modules of lighting fixtures and lighting systems. In an example embodiment, a lighting fixture includes a voltage source circuit and a first light module comprising a first current source circuit and a first light emitting diode (LED) light source. The lighting fixture further includes a second light module that includes a second current source circuit and a second LED light source. The voltage source circuit is configured to provide a voltage source output voltage to the first current source circuit and to the second current source circuit. The first current source circuit is configured to provide a first current to the first LED light source. The second current source circuit is configured to provide a second current to the second LED light source. A voltage level of the voltage source output voltage depends on a waveform of a line dimmer output voltage that is provided to the voltage source circuit.

In another example embodiment, a lighting fixture includes a voltage source circuit, and a first light module comprising a first current source circuit and a first light emitting diode (LED) light source. The lighting fixture further includes a second light module that includes a second current source circuit and a second LED light source, where the voltage source circuit is configured to provide a voltage source output voltage to the first current source circuit and to the second current source circuit. The first current source circuit is configured to provide a first current to the first LED light source. The second current source circuit is configured to provide a second current to the second LED light source. A voltage level of the voltage source output voltage depends on a dim level control input that is provided to the voltage source circuit.

In another example embodiment, a lighting system includes a line dimmer, and a lighting fixture. The light fixture includes a voltage source circuit, and a first light module comprising a first current source circuit and a first light emitting diode (LED) light source. The light fixture further includes a second light module that includes a second current source circuit and a second LED light source, where the voltage source circuit is configured to provide a voltage source output voltage to the first current source circuit and to the second current source circuit. The first current source circuit is configured to provide a first current to the first LED light source, and the second current source circuit is configured to provide a second current to the second LED light source. A voltage level of the voltage source output voltage depends on a waveform of a line dimmer output voltage that is provided to the voltage source circuit by a line dimmer.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIG. 3A illustrates a forward phase-cut dimmer circuit that may be used as the line dimmer 104 of FIG. 1 according to an example embodiment;

FIG. 3B illustrates a reverse phase-cut dimmer circuit that may be used as the line dimmer of FIG. 1 according to an example embodiment;

Figure 1:
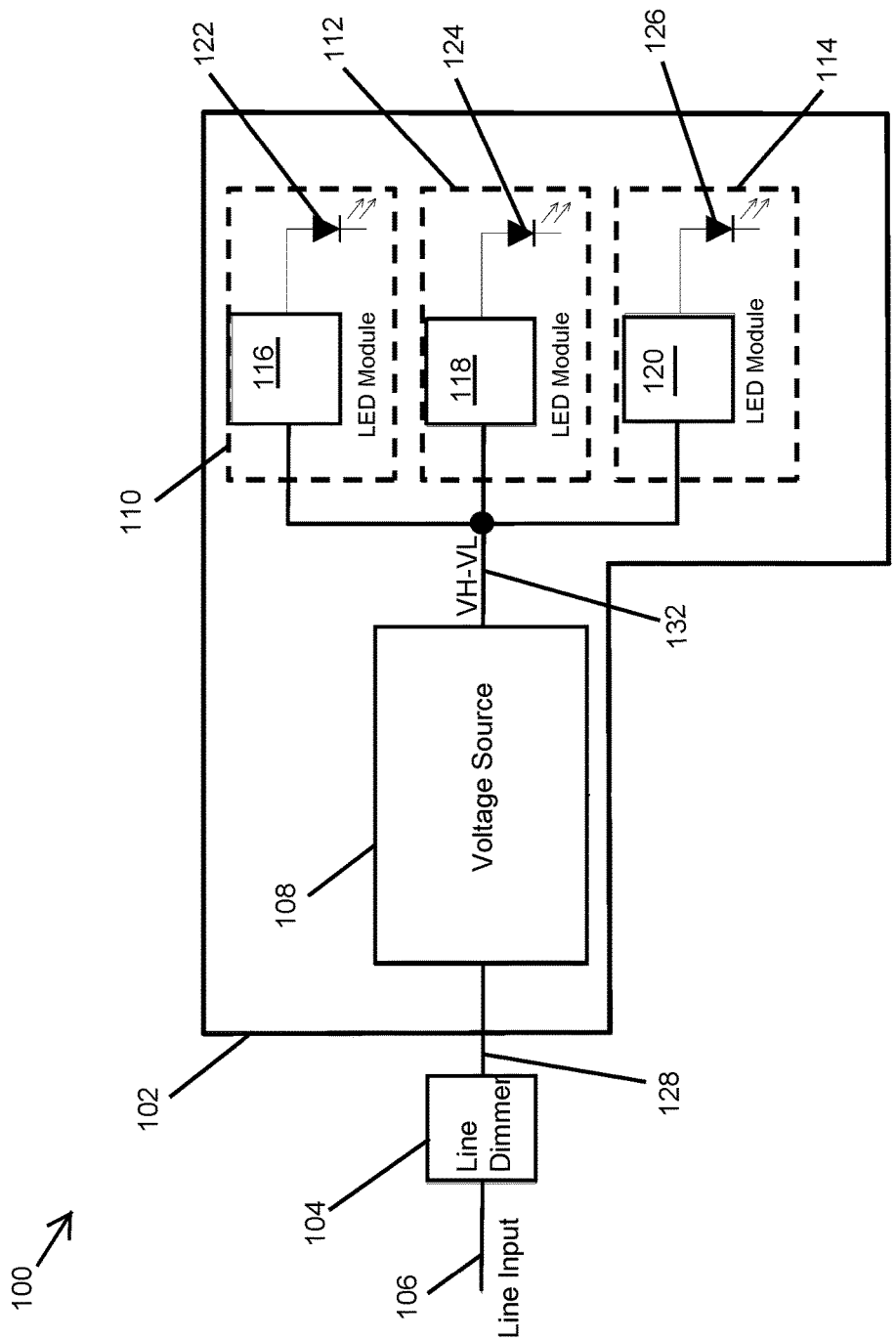
FIG. 1 illustrates a lighting system including a lighting fixture with multiple light modules according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different drawings may designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a lighting fixture may include a main DC voltage source and configurable LED modules that have built-in DC-DC current sources. The main DC voltage source may include an AC-to-DC converter and may supply DC power to a number of the LED modules. Each LED module consists of a DC voltage to current converter and an LED light source. The output current of each LED module is independent of the total number of LED modules in the lighting fixture and can be controlled by a line dimmer (e.g., a phase-cut dimmer) or another dimming mechanism such as a 0-10V dimmer, DALI controlled dimming, DMX, etc. The output of each LED module can be controlled to change from 100% to 0% in a linear response to the voltage level of the DC power signal provided by the DC voltage source changing from a first voltage level to a second voltage level. For example, the first voltage level and the second voltage level may be 100% and 60% of maximum voltage level of the DC power signal, respectively. The voltage level of the DC power signal may swing between the first voltage level and the second voltage level in response to line dimming or any other form of dim control, such as 0-10V or DALI.

Turning now to the figures, particular embodiments are described. FIG. 1 illustrates a lighting system 100 including a lighting fixture 102 with multiple light modules according to an example embodiment. In some example embodiments, the lighting system 100 includes the lighting fixture 102 and a line dimmer 104. An AC power signal may be provided to the line dimmer 104 via a line input connection 106. For example, the AC power signal may be a mains power signal. The line dimmer 104 may provide a dimmer output signal to the lighting fixture 102 via a connection 128 (e.g., one or more electrical wires). For example, the line dimmer 104 may adjust the dimmer output signal based on a dim level setting of the line dimmer 104.

In some example embodiments, the line dimmer 104 may be a phase-cut dimmer that generates a dimmer output signal on the connection 128 by limiting the power that is transferred from a power source (e.g., mains power source) to the lighting fixture 102. The dim level information that conveys the dim level setting of the line dimmer 104 is provided to the lighting fixture 102 via the dimmer output signal. The power source that provides power to the line dimmer 104 may be a 120-volt, 60-Hertz power source. Alternatively, the power source may be 220 to 240-volt, 50-Hertz or another power source.

In some example embodiments, the lighting fixture 102 may include a voltage source circuit 108, and light modules 110, 112, 114. The voltage source 108 may receive the dimmer output signal from the line dimmer 104 via the connection 128 and generate a direct-current (DC) voltage source signal (i.e., voltage source output voltage) on the connection 132 (e.g., one or more electrical wires). In some example embodiments, the dimmer 104 may have a slider for adjusting the dim level setting of the dimmer 104. Alternatively, the dim level setting may be controlled by other means, such as a rotatable knob or wirelessly, known to those of ordinary skill in the art.

In some example embodiments, adequate power is provided to the voltage source circuit 108 at the dimmest dim level setting of the line dimmer 104 such that the voltage source circuit 108 can continue to operate properly. For example, the dimmest dim level setting of the line dimmer 104 may result in eighty percent of the maximum power received by the line dimmer 104 being transferred to the voltage source circuit 108. To illustrate, a maximum firing angle of the dimmer output signal from the line dimmer 104 may be approximately thirty five percent. As another example, the dimmest dim level setting of the line dimmer 104 may result in thirty percent of the maximum power received by the line dimmer 104 being transferred to the voltage source circuit 108. When the line dimmer 104 is set to the brightest dim level setting, the AC power received by the line dimmer 104 via the line input connection 106 may be fully transferred to the voltage source circuit 108, for example, where the firing angle of the dimmer output signal is zero.

In some example embodiments, the voltage source circuit 108 may receive AC power from the line dimmer 104 and may provide the DC power to the current source circuits 116, 118, 120 via the connection 132. For example, an output of the voltage source circuit 108 and inputs of the current source circuits 116, 118, 120 may be connected to the connection 132 such that the current source circuits 116, 118, 120 receive the voltage source signal from the voltage source circuit 108. The voltage level of the voltage source signal from the voltage source circuit 108 depends on the dimmer output signal that is provided to the voltage source circuit 108 via the connection 128. To illustrate, the voltage level of the voltage source signal may range between an upper voltage level, VH, and a lower voltage level, VL.

In some example embodiments, the voltage source signal provided by the voltage source circuit 108 is at the upper voltage level, VH, when the line dimmer output signal provided by the line dimmer 104 has the minimum firing angle corresponding to the brightest dim level setting of the line dimmer 104. The voltage source signal provided by the voltage source circuit 108 may be at the lower voltage level, VL, when the line dimmer output signal has the maximum firing angle corresponding to the dimmest dim level setting of the line dimmer 104.

In general, the lower voltage level, VL, is higher than zero volts and lower than the upper voltage level, VH. For example, the lower voltage level, VL, may be at least fifty percent of the upper voltage level. As another example, the lower voltage level, VL, may be at least thirty percent of the upper voltage level. The lower voltage level, VL, may be as close to zero volts as possible so long as the voltage source circuit 108 has the minimum control voltage to keep it in stable operation and the lower voltage level, VL, is adequate for the light modules 110, 112, 114 to operate properly.

In some example embodiments, the lighting module 110 includes a current source circuit 116 and a light source 122. For example, the light source 122 may be a light emitting diode (LED) light source that includes one or more LEDs such as discrete LEDs, an array of LEDs, organic LEDs, etc. The current source circuit 116 may provide a current to the light source 122, and the light source 122 may emit a light that has an intensity level corresponding to the power provided by the current source circuit 116 to the light source 122. For example, the intensity of the light emitted by the light source 122 may depend on the amplitude of the current provided to the light source 122 by the current source circuit 116.

In some example embodiments, the lighting module 112 may include a current source circuit 118 and a light source 124. For example, the light source 124 may be an LED light source that includes one or more LEDs such as discrete LEDs, an array of LEDs, organic LEDs, etc. The current source circuit 118 may provide a current to the light source 124, and the light source 124 may emit a light that has an intensity level corresponding to power provided by the current source circuit 118 to the light source 124. For example, the intensity of the light emitted by the light source 124 may depend on the amplitude of the current provided to the light source 124 by the current source circuit 118.

In some example embodiments, the lighting module 114 may include a current source circuit 120 and a light source 126. For example, the light source 126 may be an LED light source that includes one or more LEDs such as discrete LEDs, an array of LEDs, organic LEDs, etc. The current source circuit 120 may provide a current to the light source 126, and the light source 126 may emit a light that has an intensity level corresponding to power provided by the current source circuit 120 to the light source 126. For example, the intensity of the light emitted by the light source 126 may depend on the amplitude of the current provided to the light source 126 by the current source circuit 120.

In some example embodiments, the amplitudes of the currents provided to the light sources 122, 124, 126 depends on the voltage level of the voltage source signal provided by the voltage source circuit 108. For example, the currents provided to the light sources 122, 124, 126 may have approximately a maximum amplitude (e.g., within +/−5 percent an upper amplitude limit) when the voltage level of the voltage source signal equals the upper voltage level, VH. The currents provided to the light sources 122, 124, 126 may have approximately a minimum amplitude (e.g., within +/−5 percent a lower amplitude limit) when the voltage level of the voltage source signal equals the lower voltage level, VL. For example, the minimum amplitude corresponding to the lower voltage level, VL, may be zero (i.e., Dim-to-dark) or another value above zero.

In some example embodiments, the light provided by the light source 122 is fully dimmed when the current provided to the light source 122 by the current source circuit 116 has the minimum amplitude. The light provided by the light source 124 is fully dimmed when the current provided to the light source 124 by the current source circuit 118 has approximately the minimum amplitude. The light provided by the light source 126 is fully dimmed when the current provided to the light source 126 by the current source circuit 120 has approximately the minimum amplitude.

In some example embodiments, the light provided by the light source 122 is at full brightness level when the current provided to the light source 122 by the current source circuit 116 has the maximum amplitude. The light provided by the light source 124 is at full brightness level when the current provided to the light source 124 by the current source circuit 118 has approximately the maximum amplitude. The light provided by the light source 126 is at full brightness level when the current provided to the light source 126 by the current source circuit 120 has approximately the maximum amplitude.

During operations, the line dimmer 104 operates as a typical line dimmer (e.g., a phase-cut dimmer). As the dim level of the line dimmer 104 is adjusted between a brightest setting and a dimmest setting, the power provided to the voltage source circuit 108 changes accordingly. For example, at the brightest setting, the AC power received by the line dimmer 104 may be mostly or fully transferred to the voltage source circuit 108 via the connection 128. At the dimmest setting, a portion (e.g., 80 percent, 60 percent, 30 percent, etc.) of the full AC power received by the line dimmer 104 is transferred to the voltage source circuit 108. The line dimmer 104 may be configured such that the dimmest setting corresponds to a smaller firing angle than typical line dimmers in order to provide adequate power for the voltage source circuit 108 and the light modules 110, 112, 114 to operate properly even at the dimmest setting of the line dimmer 104. The voltage source circuit 108 receives the AC signal from the line dimmer 104 and generates the DC voltage source signal from the AC signal.

The voltage level of the DC voltage source signal generated by the voltage source circuit 108 depends on the AC power level of the AC signal received from the line dimmer 104. For example, when the dim level is set to the brightest setting, the DC voltage source signal may have the upper voltage level, VH, (e.g., 60 volts, 48 volts, 36 volts, 24 volts, etc.), and when the dim level is set to the dimmest setting, the DC voltage source signal may have the lower voltage level, VL, (e.g., 60% of VH, 50% of VH, 30% of VH, etc.). When the dim level is set between the brightest setting and the dimmest setting, the DC voltage source signal may have a voltage level between the upper voltage level, VH, and the lower voltage level, VL. The DC voltage source signal from the voltage source circuit 108 is provided to each of the light modules 110, 112, 114, and each current source circuit 116, 118, 120 generates a current based on the voltage level of the DC voltage source signal.

The current from each current source circuit 116, 118, 120 is provided to the respective light source 122, 124, 126. The amplitude of each current depends on the voltage level of the DC voltage source signal from the voltage source circuit 108 and may range from a maximum amplitude corresponding to the upper voltage level, VH, of the DC voltage source signal to a minimum amplitude corresponding to the lower voltage level, VL, of the DC voltage source signal. For example, the amplitude of each current may be linearly related to the voltage level of the voltage source signal provided by the voltage source circuit 108. The minimum amplitude of the current provided by each current source circuit 116, 118, 120 may be as close to zero as possible to achieve the dimmest intensity level of the light emitted by the respective light source 122, 124, 126 corresponding to the dimmest setting of the line dimmer 104. The upper voltage level, VH, the lower voltage level, VL, and the amplitudes of the currents provided by the current source circuits 116, 118, 120 may depend on the particular design of the lighting fixture 102 as can be readily understood by those of ordinary skill in the art with the benefit of this disclosure.

Because a voltage source circuit 108 provides a constant voltage signal to the current source circuits 116, 118, 120, a removal or malfunction of one of the light modules 110, 112, 114 may not affect the operation of the remaining ones of the light modules 110, 112, 114. Because a current is provided to each light source 122, 124, 126 by the respective current source circuit 116, 118, 120, the current provided to each light source 122, 124, 126 is independent of the current provided to the other ones of the light sources 122, 124, 126. For example, the current provided to the light source 122 by the current source circuit 116 is unaffected by the current provided to the light sources 124, 126. To illustrate, the amount of current provided to the light source 122 is unaffected by the removal, replacement, or malfunction of one or both of the light modules 112, 114. The current provided to each light source 122, 124, 126 is also unaffected by the removal, replacement, malfunction, or degradation of another one of the light sources 122, 124, 126. The currents provided to the light sources 122, 124, 126 may also be unaffected by the addition of another light module to the lighting fixture 102 or the addition of another light source to one of the light modules 110, 112, 114.

Although the lighting fixture 102 is shown with three light modules, in some alternative embodiments, the lighting fixture 102 may include two or more than three light modules without departing from the scope of this disclosure. In some example embodiments, the light source of each light module may have various configurations than shown without departing from the scope of this disclosure. In some alternative embodiments, the lighting fixture 102 may have a different configuration than shown without departing from the scope of this disclosure. For example, the light modules may be integrated into a single component or the current source circuits may be integrated into a single component.

Figure 2:
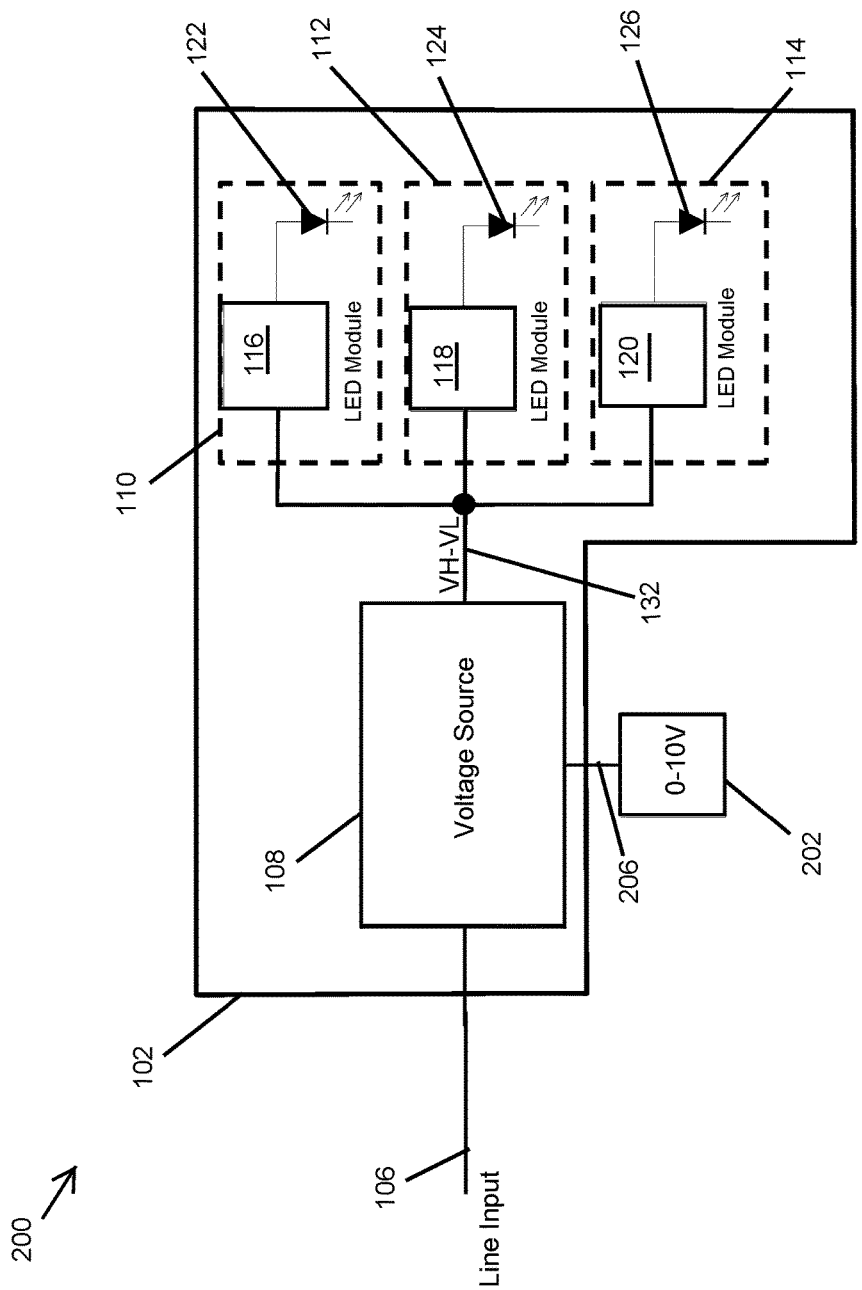
FIG. 2 illustrates a lighting system including a lighting fixture with multiple light modules according to another example embodiment.

FIG. 2 illustrates a lighting system 200 including the lighting fixture 102 with multiple light modules according to another example embodiment. In some example embodiments, the lighting system 200 includes the lighting fixture 102 and a dimmer 202 that provides a dim level control input to the lighting fixture 102. In some example embodiments, the dimmer 202 may be a 0-10 volt dimmer or another type of dimmer (e.g., a DALI device). To illustrate, the dimmer 202 may provide to the lighting fixture 102 one or more electrical signals having voltage ranging from 0 volts to 10 volts depending on the dim level setting of the dimmer 202. For example, the dimmer 202 may have a slider for adjusting the dim level setting of the dimmer 202. Alternatively, the dim level setting may be controlled by other means, such as a rotatable knob or wirelessly, known to those of ordinary skill in the art.

In some example embodiments, an AC power signal may be provided to the lighting fixture 102 via the line input connection 106. For example, the AC power signal may be a mains power signal. In contrast to the system 100 of FIG. 1, the system 200 may not include a line dimmer.

In some example embodiments, the lighting fixture 102 includes the voltage source circuit 108, and the light modules 110, 112, 114. The voltage source 108 may receive the AC power signal via the line input connection 106 and generate a direct-current (DC) voltage source signal on the connection 132 (e.g., one or more electrical wires) from the received AC power signal. The voltage source signal generated by the voltage source 108 may be provided to the light modules 110, 112, 114 via the connection 132 as described above with respect to FIG. 1. The voltage level of the voltage source signal from the voltage source circuit 108 depends on the dim level control input that is provided to the voltage source circuit 108 via a connection 206 (e.g., one or more electrical wires). That is, the voltage level of the voltage source signal from the voltage source circuit 108 depends on the dim level setting of the dimmer 202 because the dim level control input provided by the dimmer 202 depends on or reflects the dim level setting of the dimmer 202.

In some example embodiments, the voltage level of the voltage source signal provided by the voltage source circuit 108 may range between an upper voltage level, VH, and a lower voltage level, VL. The voltage source signal is at the upper voltage level, VH, when the dimmer 202 is set to a brightest level, and the voltage source signal provided may be at the lower voltage level, VL, when the dimmer 202 is set to a dimmest level. The upper voltage level, VH, and the lower voltage level, VL, may correspond to the upper voltage level, VH, and the lower voltage level, VL, respectively, described above with respect to FIG. 1. For example, the lower voltage level, VL, may be at least fifty percent of the upper voltage level. As another example, the lower voltage level, VL, may be at least twenty percent of the upper voltage level. In general, the lower voltage level, VL, may be as close to zero volts as possible so long as the lower voltage level, VL, is adequate for the light modules 110, 112, 114 to operate properly at the dimmest dim level setting of the dimmer 202.

In some example embodiments, the light modules 110, 112, 114 correspond to and operate in the substantially the same manner as the light modules 110, 112, 114 described above with respect to FIG. 1. For example, the light module 110 includes the current source 116 and the light source 122, where the current source 116 receives the voltage source signal from the voltage source circuit 108 via the connection 132 and generates a current that is provided to the light source 122. The light module 112 includes the current source 118 and the light source 124, where the current source 118 receives the voltage source signal from the voltage source circuit 108 via the connection 132 and generates a current that is provided to the light source 124. The light module 114 includes the current source 120 and the light source 126, where the current source 120 receives the voltage source signal from the voltage source circuit 108 via the connection 132 and generates a current that is provided to the light source 126.

The amplitudes of the currents provided to the light sources 122, 124, 126 depend on the voltage level of the DC voltage source signal from the voltage source circuit 108 as described with respect to FIG. 1. The amplitude of each current may range from a maximum amplitude corresponding to the upper voltage level, VH, of the DC voltage source signal to a minimum amplitude corresponding to the lower voltage level, VL, of the DC voltage source signal. For example, the amplitude of each current may be linearly related to the voltage level of the DC voltage source signal provided by the voltage source circuit 108. The minimum amplitude of the current provided by each current source circuit 116, 118, 120 may be close to zero as possible to achieve the dimmest intensity level of the light emitted by the respective light source 122, 124, 126 corresponding to the dimmest setting of the line dimmer 104. The upper voltage level, VH, the lower voltage level, VL, and the amplitudes of the currents provided by the current source circuits 116, 118, 120 to the light sources 122, 124, 126 may depend on the particular design of the lighting fixture 102 as can be readily understood by those of ordinary skill in the art with the benefit of this disclosure.

In some example embodiments, the light provided by the light source 122 is fully dimmed when the current provided to the light source 122 by the current source circuit 116 has the minimum amplitude corresponding to the dimmest setting of the dimmer 202. The light provided by the light source 124 is fully dimmed when the current provided to the light source 124 by the current source circuit 118 has approximately the minimum amplitude. The light provided by the light source 126 is fully dimmed when the current provided to the light source 126 by the current source circuit 120 has approximately the minimum amplitude.

In some example embodiments, the light provided by the light source 122 is at full brightness level when the current provided to the light source 122 by the current source circuit 116 has the maximum amplitude corresponding to the brightest setting of the dimmer 202. The light provided by the light source 124 is at full brightness level when the current provided to the light source 124 by the current source circuit 118 has approximately the maximum amplitude. The light provided by the light source 126 is at full brightness level when the current provided to the light source 126 by the current source circuit 120 has approximately the maximum amplitude.

Because a current is provided to each light source 122, 124, 126 by the respective current source circuit 116, 118, 120, the current provided to each light source 122, 124, 126 is independent of the current provided to the other ones of the light sources 122, 124, 126. For example, the current provided to the light source 122 by the current source circuit 116 is unaffected by the current provided to the light sources 124, 126. To illustrate, the amount of current provided to the light source 122 is unaffected by the removal, replacement, or malfunction of one or both of the light module 112, 114. The current provided to each light source 122, 124, 126 is also unaffected by the removal, replacement, malfunction, or degradation of another one of the light sources 122, 124, 126. The currents provided to the light sources 122, 124, 126 may also be unaffected by the addition of another light module to the lighting fixture 102 or the addition of another light source to one of the light modules 110, 112, 114.

Although the lighting fixture 102 is shown with three light modules, in some alternative embodiments, the lighting fixture 102 may include two or more than three light modules without departing from the scope of this disclosure. In some example embodiments, the light source of each light module may have various configurations than shown without departing from the scope of this disclosure. In some alternative embodiments, the lighting fixture 102 may have a different configuration than shown without departing from the scope of this disclosure. For example, the light modules may be integrated into a single component or the current source circuits may be integrated into a single component. In some alternative embodiments, the dimmer 202 may be added to the lighting system 100 of FIG. 1.

FIG. 3A illustrates a forward phase-cut dimmer circuit 300 that may be used as the line dimmer 104 of FIG. 1 according to an example embodiment. In some example embodiments, the line input of the forward phase-cut dimmer circuit 300 may be connected to an AC power source (e.g., a mains power). The forward phase-cut dimmer circuit 300 may output a dimmer output signal via the dimmer output of the forward phase-cut dimmer circuit 300. For example, the line input of the dimmer circuit 300 may be connected to the line input connection 106 shown in FIG. 1, and the dimmer output of the forward phase-cut dimmer circuit 300 may be connected to the connection 128 shown in FIG. 1.

In some example embodiments, the forward phase-cut dimmer circuit 300 may include a variable resistor 302 (e.g., a potentiometer) that is adjustable by a user as can be understood by those of ordinary skill in the art with the benefit of this disclosure. The forward phase-cut dimmer circuit 300 may also include a fixed resistor 304. The fixed resistor 304 may be selected such that the maximum firing angle of the dimmer output signal is small enough such that adequate AC power is provided to the DC voltage source circuit 108 of FIGS. 1 and 2 when the variable resistor 302 is adjusted to a dimmest setting of the dimmer circuit 300.

Figure 4:
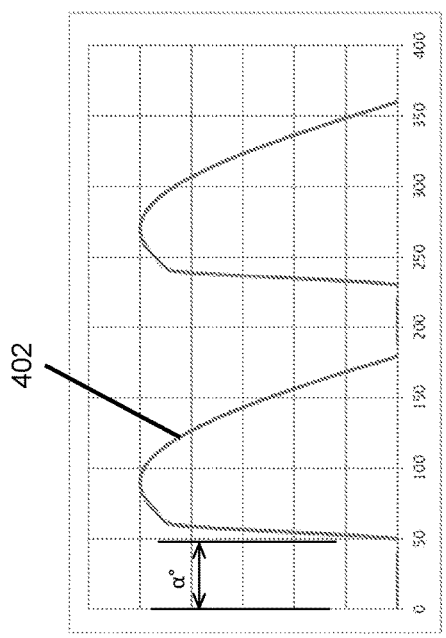
FIG. 4 is a graph illustrating a waveform of a dimmer output signal of the forward phase-cut dimmer circuit of FIG. 3A after rectification according to an example embodiment.

To illustrate, FIG. 4 shows a graph 400 illustrating a waveform 402 of the dimmer output signal of the forward phase-cut dimmer circuit 300 of FIG. 3A after rectification according to an example embodiment. The firing angle, a, of the dimmer output signal provided by the forward phase-cut dimmer circuit 300 may have a maximum value corresponding to the dimmest setting of the forward phase-cut dimmer circuit 300 that is controlled by the variable resistor 302. For example, the fixed resistor 304 may be selected to a value such that the maximum value of the firing angle, a, is approximately 50 degrees or another value that allows adequate power to be transferred to the DC voltage source circuit 108 and the light modules 110, 112, 114 even at the dimmest setting of the forward phase-cut dimmer circuit 300.

In some alternative embodiments, the dimmer circuit 300 may have a different configuration than shown without departing from the scope of this disclosure. In some alternative embodiments, the dimmer circuit 300 may include one or more components other than shown without departing from the scope of this disclosure. In some alternative embodiments, the dimmer circuit 300 may be implemented using different components than shown without departing from the scope of this disclosure.

FIG. 3B illustrates a reverse phase-cut dimmer circuit 310 that may be used as the line dimmer 104 of FIG. 1 according to an example embodiment. In some example embodiments, the line input of the reverse phase-cut dimmer circuit 310 may be connected to an AC power source (e.g., a mains power). The reverse phase-cut dimmer circuit 310 may output a dimmer output signal via the dimmer output of the reverse phase-cut dimmer circuit 310. For example, the line input of the dimmer circuit 310 may be connected to the line input connection 106 shown in FIG. 1, and the dimmer output of the reverse phase-cut dimmer circuit 310 may be connected to the connection 128 shown in FIG. 1.

In some example embodiments, the reverse phase-cut dimmer circuit 310 may include a variable resistor 312 (e.g., a potentiometer) that is adjustable by a user as can be understood by those of ordinary skill in the art with the benefit of this disclosure. The reverse phase-cut dimmer circuit 310 may also include a fixed resistor 314. The fixed resistor 314 may be selected such that the maximum firing angle of the dimmer output signal is small enough such that adequate AC power is provided to the DC voltage source circuit 108 of FIGS. 1 and 2 when the variable resistor 312 is adjusted to a dimmest setting of the dimmer circuit 310.

Figure 5:
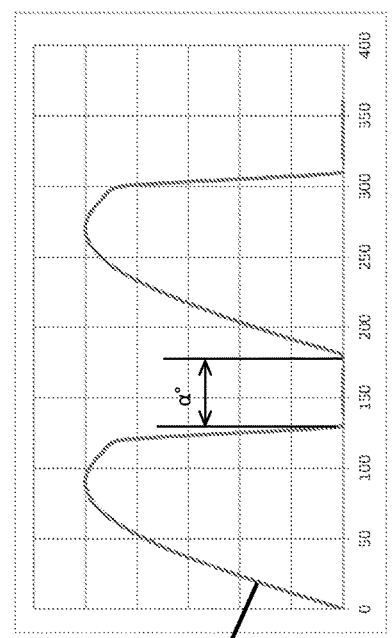
FIG. 5 is a graph illustrating a waveform of a dimmer output signal of the reverse phase-cut dimmer circuit of FIG. 3B after rectification according to an example embodiment.

To illustrate, FIG. 5 is a graph 500 illustrating a dimmer output signal of the reverse phase-cut dimmer circuit 310 of FIG. 3B after rectification according to an example embodiment. The firing angle, a, of the dimmer output signal provided by the reverse phase-cut dimmer circuit 310 may have a maximum value corresponding to the dimmest setting of the reverse phase-cut dimmer circuit 310 that is controlled by the variable resistor 312. For example, the fixed resistor 314 may be selected to a value such that the maximum value of the firing angle, a, is approximately 50 degrees or another value that allows adequate power to be transferred to the DC voltage source circuit 108 and the light modules 110, 112, 114 even at the dimmest setting of the reverse phase-cut dimmer circuit 310.

In some alternative embodiments, the dimmer circuit 310 may have a different configuration than shown without departing from the scope of this disclosure. In some alternative embodiments, the dimmer circuit 310 may include one or more components other than shown without departing from the scope of this disclosure. In some alternative embodiments, the dimmer circuit 310 may be implemented using different components than shown without departing from the scope of this disclosure.

Figure 6:
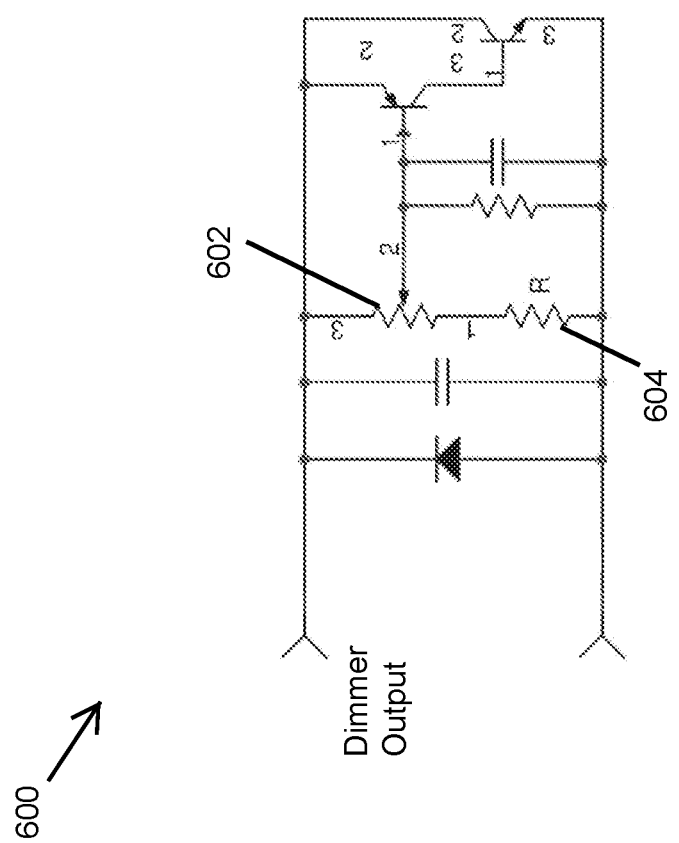
FIG. 6 illustrates a 0-10V dimmer circuit corresponding to the dimmer of FIG. 2 according to an example embodiment.

FIG. 6 illustrates a 0-10V dimmer circuit 600 corresponding to the dimmer 202 of FIG. 2 according to an example embodiment. The 0-10V dimmer circuit 600 may include a variable resistor 602 (e.g., a potentiometer) and a fixed resistor 604. The dim level setting of the dimmer circuit 600 is adjustable by adjusting the variable resistor 602. The fixed resistor 604 can be selected to have a value such that the lowest voltage level of a dim level control signal on the dimmer output does reach the typical lowest limit (i.e., 0 volt) of the 0-10 v range. For example, the fixed resistor 604 can be selected to have a value such that the dim level control signal provided to the voltage source circuit 108 of FIG. 2 is in the range of 5V-10V instead of the typical 0V-10V.

Limiting the lowest voltage level of the dim level control signal provided by the dimmer circuit 600 allows the voltage source circuit 108 and the light modules 110, 112, 114 of FIG. 2 to have adequate power to continue operating even at the lowest dim level setting of the dimmer circuit 600. The dimmer circuit 600 is generally a typical 0-10V dimmer circuit, where the lowest voltage level of the dim level control signal provided by the dimmer circuit 600 is set to be above 0 volt. The lowest voltage level of the dim level control signal may be set to a particular value (e.g., 2 volts, 5 volts, 7 volts, 9 volts, etc.) by selecting the value of the fixed resistor based on the power needs of a particular lighting fixture or lighting system at the lowest dim level setting.

In some alternative embodiments, the dimmer circuit 600 may have a different configuration than shown without departing from the scope of this disclosure. In some alternative embodiments, the dimmer circuit 600 may include other components or some of the components may be omitted or integrated together without departing from the scope of this disclosure. In some alternative embodiments, the dimmer circuit 600 may be implemented using different components than shown without departing from the scope of this disclosure.

Figure 7:
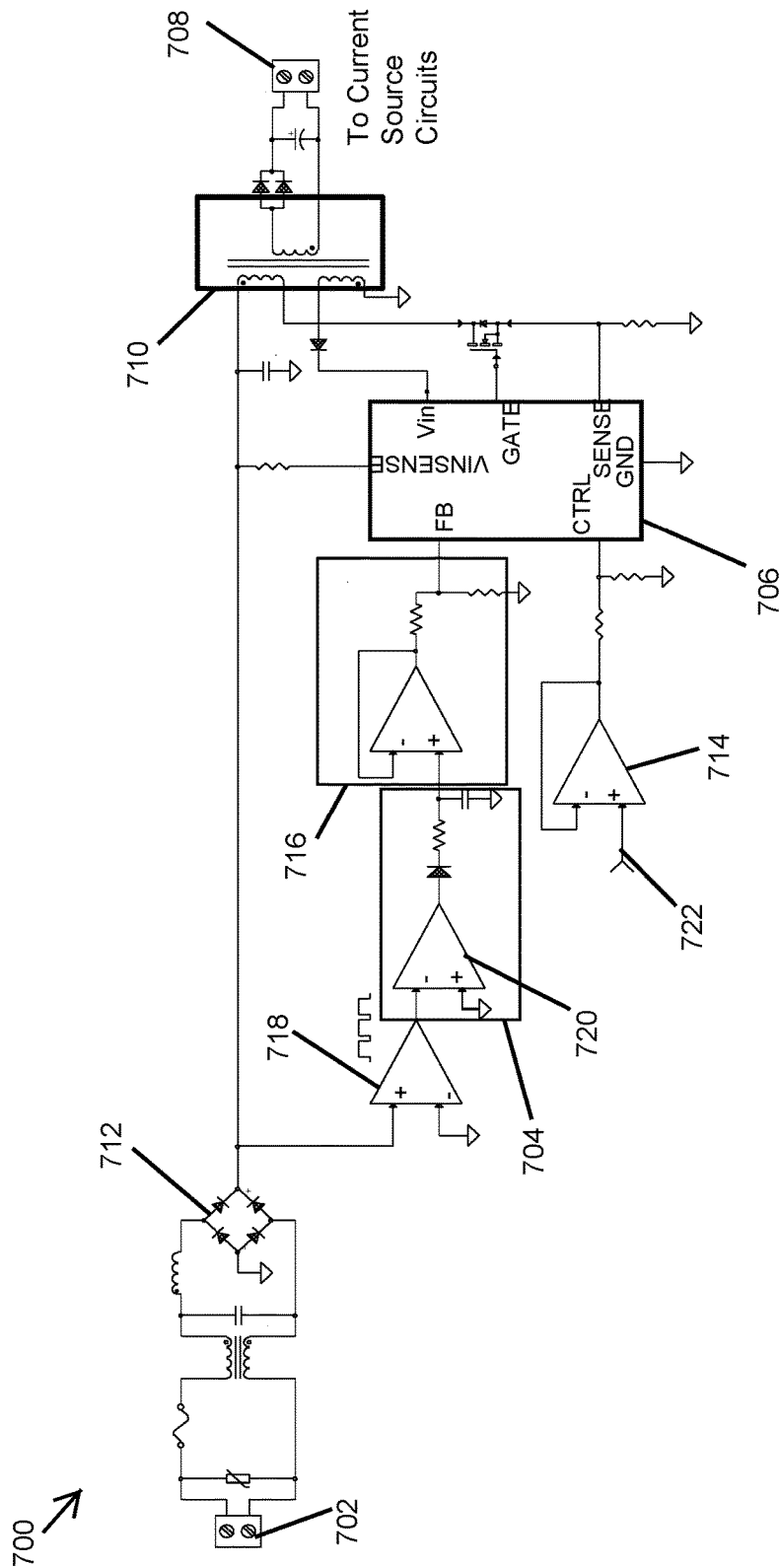
FIG. 7 illustrates a DC voltage source circuit corresponding to the DC voltage source circuit of FIGS. 1 and 2 according to an example embodiment.

FIG. 7 illustrates a DC voltage source circuit 700 corresponding to the DC voltage source circuit 108 of FIGS. 1 and 2 according to an example embodiment. Referring to FIGS. 1, 2, and 7, in some example embodiments, the voltage source circuit 700 includes an AC connection port 702 that may be connected to the output of the line dimmer 104 of FIG. 1 via the connection 128 or to the line input connection 106 of FIG. 2 that is connected to an AC power source. The voltage source circuit 700 may also include a rectifier circuit 712 that receives an AC signal from the AC power source or from the line dimmer 104 and generates a rectified output signal. For example, either one of the waveform shown in FIGS. 4 and 5 may represent output of the rectifier circuit 712 depending on the type of the line dimmer 104.

In some example embodiments, the output signal of the rectifier circuit 712 may be provided, through a voltage divider (not shown), to a comparator 718 (e.g., an operational amplifier configured as a comparator) that compares the voltage level of the voltage divided output signal of the rectifier circuit 712 to a threshold voltage level. For example, the comparator 718 may generate a pulse-width-modulation (PWM) signal that carries the phase information of the line dimmer 104 (e.g., a phase-cut dimmer). To illustrate, the comparator 718 may generate a square wave output signal, where the voltage level of the square wave output signal corresponds a "high" pulse when the output signal of the rectifier circuit 712 exceeds the threshold. The threshold voltage level can be kept close to zero, which results in the square wave output signal of the comparator 718 being dependent on the phase of the output signal of the rectifier circuit 712 and allows the line dimmer 104 and the rectifier circuit 712 to operate with universal AC input voltage levels (e.g., 90-300 VAC).

In some example embodiments, the output signal generated by the comparator 718 is provided to an average detector 704 that includes the operational amplifier 720. The average detector 704 transfers the phase information from the output of the comparator 718 to a small signal DC voltage, which is uniquely related to the dimmer output signal from the line dimmer 104. The small signal DC voltage is provided to a buffer 716 that outputs a control signal that is provided to a feedback input, FB (Voltage Feedback), of a power management controller 706. For example, the voltage level at the feedback input, FB, may range between 0.6 volt and 1.2 volt. The power management controller 706 may be LT3798 from Linear Technology-Analog Devices or other equivalent IC or system of components.

The small signal DC voltage that is generated by the average detector 724 is proportional to the dimmer phase angle of the dimmer output signal from the line dimmer 104. As shown in FIG. 7, the small signal DC voltage may be scaled by a voltage divider and provided to the feedback input, FB, of the controller 706, which forces the output voltage of the voltage source circuit 700 to follow the phase angle of the dimmer output signal provided by the line dimmer 104. For example, if the dimmer changes the phase angle of the dimmer output signal from one extreme to another, the voltage output of the voltage source may swing from one end of the output voltage range (e.g., 24V) to the other end of the output voltage range (12V).

In some example embodiments, the controller 706 receives a feedback signal from an output transformer 710 at a voltage input, Vin, of the controller 706. The controller 706 regulates the output voltage of the voltage source circuit 700 at a desired voltage within a range of output voltages (e.g., 12 volts-24 volts).

In some example embodiments, the DC voltage source circuit 700 provides a DC signal, (i.e., the voltage source output signal) through the DC connection port 708. For example, the DC connection port 708 may be connected to the connection 132 shown in FIGS. 1 and 2. The voltage level of the voltage source output signal provided by the voltage source circuit 700 is controlled between the upper voltage level, VH, (e.g., 24 volts) and the lower voltage level, VL, (e.g., 12 volts) based on the voltage level of the signal provided to the feedback input, FB, of the power management controller 706.

In some example embodiments, the AC connection port 702 may be connected to an AC power source (e.g., a mains power) without the line dimmer 104 as shown in FIG. 2. In such embodiments, the voltage level of the signal provided to the feedback input, FB, of the power management controller 706 is generally constant at a high level (e.g., approximately 1 volt). The voltage level of the voltage source output signal provided by the voltage source circuit 700 may be adjusted based on a control input, CTRL, of the power management controller 706. For example, the control input, CTRL, may be connected to an output of a buffer 714 through a voltage divider. A dim control port 722 that may be coupled to a dimmer, such as a 0-10 dimmer, a DALI dimmer, etc. is coupled to an input of the buffer 714 and may provide a dim control signal to the buffer 714. For example, the dim control port 722 may be coupled to the dimmer 202 shown in FIG. 2. The output voltage of the voltage source circuit 700 follows the voltage level of the control signal provided to the control input, CTRL, proportionally. For example, the output voltage of the voltage source circuit 700 may vary from 24V to 12V.

As described above, the dimmer 202 may be a 0-10V dimmer, a DALI dimmer, etc. and may be a wall unit, a remote device, etc. The voltage level of the voltage source output signal provided by the voltage source circuit 700 may range between the upper voltage level, VH, (e.g., 48 volts, 24 volts, etc.) and the lower voltage level, VL, (e.g., 24 volts, 12 volts, etc.) based on the voltage level of the signal provided to the control input, CTRL, of the power management controller 706. For example, as the dimmer 202 is adjusted between 10V (e.g., brightest setting) and 7V (e.g., dimmest setting), the voltage level of the voltage source output signal provided by the voltage source circuit 700 may change between 24 volts and 12 volts. As another example, as the dimmer 202 is adjusted between 10V (e.g., brightest setting) and 5V (e.g., dimmest setting), the voltage level of the voltage source output signal provided by the voltage source circuit 700 may change between 24 volts and 12 volts. As yet another example, as the dimmer 202 is adjusted between 10V (e.g., brightest setting) and 5V (e.g., dimmest setting), the voltage level of the voltage source output signal provided by the voltage source circuit 700 may change between 24 volts and 10 volts.

Although particular components and configurations are shown in FIG. 7, the voltage source circuit 700 may include different components and configurations without departing from the scope of this disclosure. In some alternative embodiments, some components of the voltage source circuit 700 may be omitted or integrated into a single component without departing from the scope of this disclosure.

Figure 8:
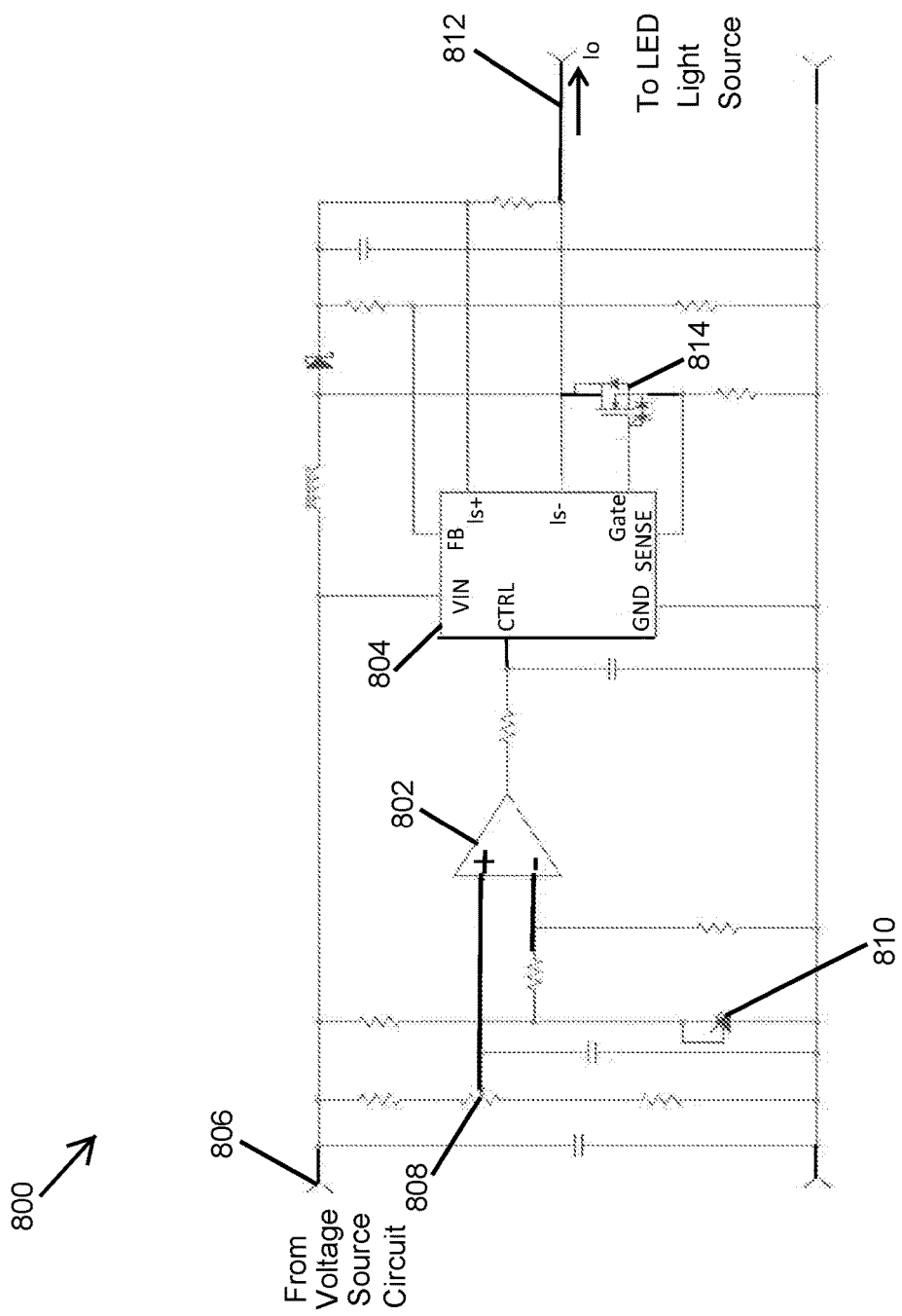
FIG. 8 illustrates a current source circuit corresponding to the current source circuits of FIGS. 1 and 2 according to an example embodiment.

FIG. 8 illustrates a DC current source circuit 800 corresponding to each current source circuit 116, 118, 120 of FIGS. 1 and 2 according to an example embodiment. Referring to FIGS. 1, 2, and 8, in some example embodiments, the current source circuit 800 may receive a constant voltage signal on an input port 806 and output a constant current signal on an output port 812. The current source circuit 800 may include an instrumentation amplifier 802, a DC-DC power management IC 804, and a fast current switching device transistor 814. The power management IC 804 may be LT3756 from Linear Technology or another equivalent IC or other circuit. The current source circuit 800 may also include a potentiometer 808 and a voltage reference component 810, which may be a temperature compensated precision voltage reference component. The potentiometer 808 may be adjusted to adjust the output current provided by the current source circuits of the light modules 110, 112, 114 to correct against the voltage drop between the voltage source 800 and the light modules 110, 112, 114, and adjust for other variations such as light module to light module variations and lighting fixture to lighting fixture variations. For example, the voltage reference component 810 may provide a reference signal having a reference voltage level to the instrumentation amplifier 802. The voltage reference component 810 may be an adjustable shunt regulator TL431 from Texas Instruments or another equivalent circuit.

In some example embodiments, the input port 806 may be connected to the output of the DC voltage source circuit 108. A signal generated/derived from the voltage source signal received at the port 806 is provided to the instrumentation amplifier 802. The instrumentation amplifier 802 may output a control signal that is provided to the CTRL input of the power management IC 804. To illustrate, the control signal provided to the CTRL input of the power management IC 804 may reflect the difference between the voltage level of the signal generated/derived from the voltage source signal and the reference voltage level at the input of the instrumentation amplifier 802. As a non-limiting example, the control signal may vary between zero and 1.2 volts.

Figure 9:
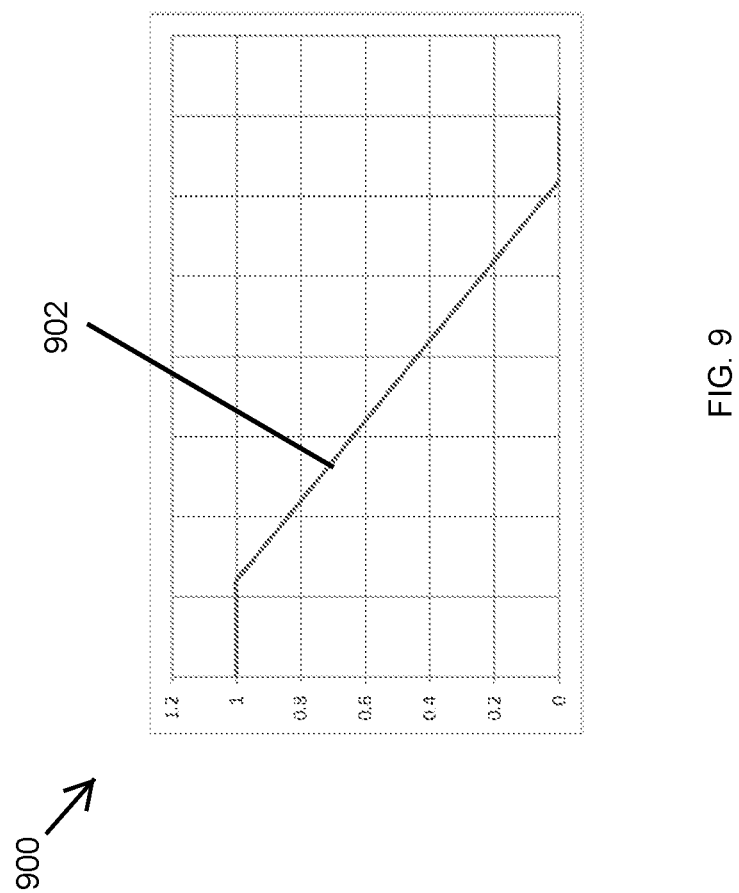
FIG. 9 is a graph illustrating a waveform of an output current signal provided by the current source circuit of FIG. 8 according to an example embodiment.

In some example embodiments, the amplitude of the output current, Io, provided by the current source circuit 800 via the output port 812 may depend on the control signal provided to the CTRL input of the power management IC 804. For example, when the control signal is at zero volts, the amplitude of the output current, Io, may be at a minimum amplitude (e.g., zero). As another example, when the control signal is at 1 volt, the amplitude of the output current, Io, may be at a maximum current. When the voltage level of the control signal is between 0 and 1 volt, the amplitude of the output current, Io, may correspondingly (e.g., linearly) change. FIG. 9 shows a graph 900 illustrating a waveform 902 of the output current signal provided by the current source circuit 800 of FIG. 8 according to an example embodiment.

In some example embodiments, the output port 812 may be connected to a light source such as an LED light source (e.g., the light source 122, 124, or 126). The intensity of the light provided by the light source may be at a full intensity level (i.e., brightest level) when the control signal provided to the CTRL input of the power management IC 804 is at 1 volt, and the light may be at lowest intensity level (i.e., dimmest level such as at full dim) when the control signal provided to the CTRL input of the power management IC 804 is at 0 volt. Because the voltage level of the control signal depends on the voltage level of the voltage source signal provided by the voltage source circuit 108, which in turn depends on the dim level setting of the dimmer 104 or the dimmer 202, the dim level of the light provided by the light source can be controlled by the dimmer 104 and the dimmer 202 through the DC voltage source circuit 108 and the DC current source circuit 800.

In some example embodiments, in different instances of the current source circuit 800, such as the current source circuits 116, 118, 120, the potentiometer 808 may be set to the same setting such that the dimming behavior of the light sources driven by the multiple instances is generally the same. In some alternative embodiments, some instances of the current source circuit 800 may have the potentiometer 808 set to different settings such that the dimming behavior of some of the light sources is different from others.

Although particular components and configurations are shown in FIG. 8, the current source circuit 800 may include different components and configurations without departing from the scope of this disclosure. In some alternative embodiments, some components of the current source circuit 800 may be omitted or integrated into a single component without departing from the scope of this disclosure. In some alternative embodiments, the control signal provided to the CTRL input of the power management IC 804 may be managed to swing between other ranges other than 0 and 1 volt, for example, by controlling the reference voltage level at the input of the instrumentation amplifier 802. The control signal provided to the CTRL input of the power management IC 804 may be managed to swing between other ranges by controlling the voltage level of the signal generated/derived from the voltage source signal from the voltage source circuit 108, for example, by adjusting the potentiometer 808. For example, the range of the control signal provided to the CTRL input of the power management IC 804 may be set between 0.2 volt and 1 volt, between 0 and 0.8 volt, etc.

Figure 10:
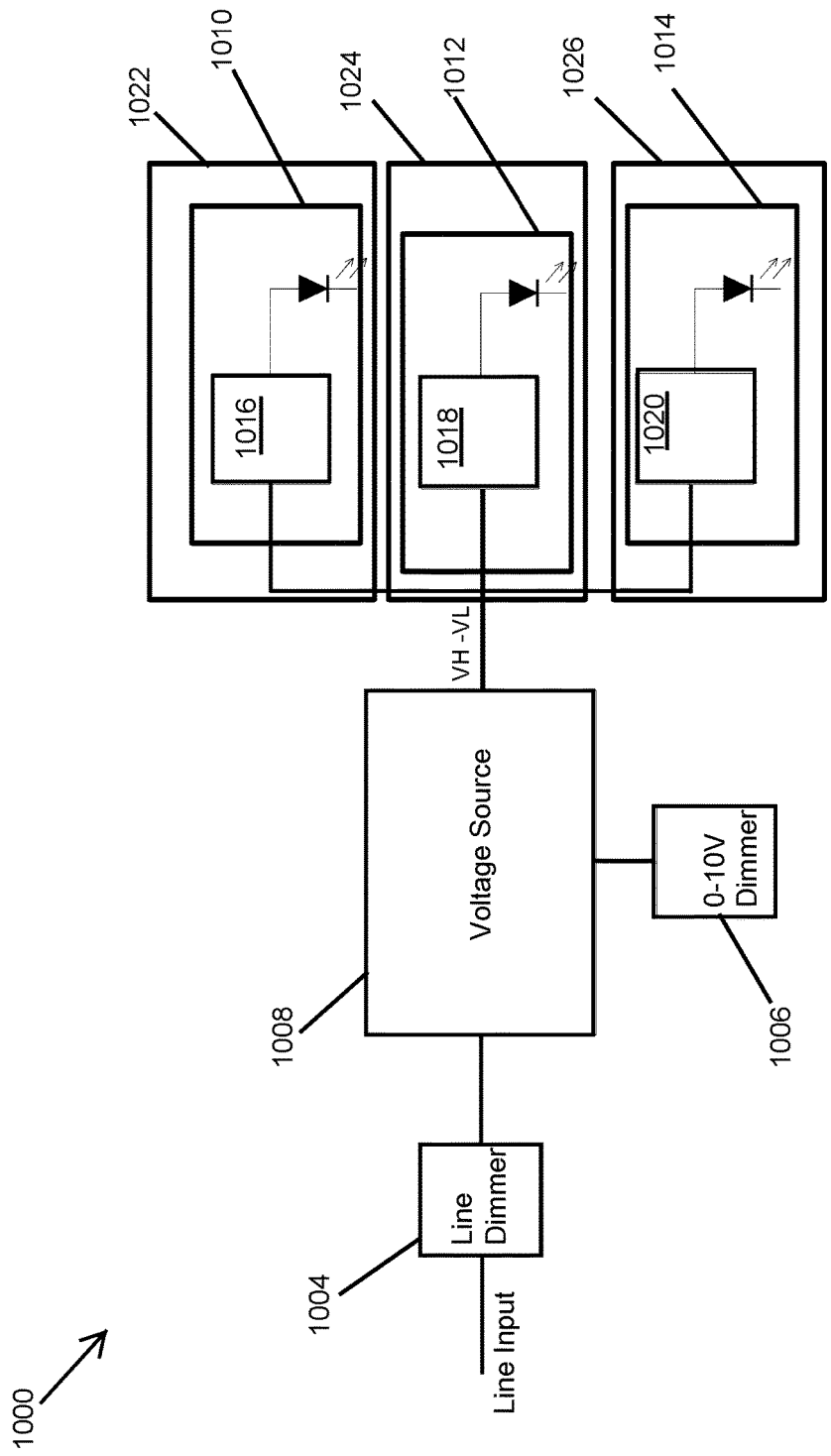
FIG. 10 illustrates a lighting system including multiple lighting fixtures that each include a light module according to an example embodiment.

FIG. 10 illustrates a lighting system 1000 including multiple lighting fixtures that each include a light module according to an example embodiment. In some example embodiments, the lighting system 1000 includes a line dimmer 1004, a DC voltage source circuit 1008, and lighting fixtures 1022, 1024, 1026. Each lighting fixture 1022, 1024, 1026 may include a DC current source circuit. For example, the lighting fixture 1022 may include a DC current source circuit 1016, the lighting fixture 1024 may include a DC current source circuit 1018, and the lighting fixture 1026 may include a DC current source circuit 1020. Each lighting fixture 1022, 1024, 1026 includes a respective light source such as an LED light source (e.g., one or more discrete LEDs, an array of LEDs, etc.)

In some example embodiments, the line dimmer 1004, the voltage source circuit 1008, and the light modules 1010, 1012, 1014 operate in a similar manner as described with respect to the line dimmer 104, the voltage source circuit 108, and the light modules 110, 112, 114, respectively, of FIG. 1. For example, the brightness level of the lights produced by the light sources of the light modules 1010, 1012, 1014 may be controlled by adjusting the dim level setting of the line dimmer 1004.

In some alternative embodiments, the line dimmer 1004 may be omitted and AC power (e.g., mains power) in a universal range of, for example, 90-300 VAC may be provided to the voltage source circuit 108 in a similar manner as described with respect to FIG. 2. The brightness level of the lights produced by the light sources of the light modules 1010, 1012, 1014 may be controlled by adjusting the dim level setting of the dimmer 1006, which may be a 0-10V dimmer, a DALI-based dimmer, DMX-based dimmer, or another type of remote or local dimmer.

In some example embodiments, the voltage source circuit 1008 receives an AC signal (from the AC power source or from the line dimmer 1004) and generates a constant voltage DC signal (i.e., a voltage source signal) that is provided to the DC current source circuits 1016, 1018, 1020 in a similar manner as described with respect to the voltage source circuit 108 of FIGS. 1 and 2. The voltage level of the voltage source signal from the voltage source circuit 1008 ranges between an upper voltage level, VH, (e.g., 48 volts) and a lower voltage level, VL, (e.g., 24 volts) based on the brightest and dimmest setting of the dimmer 1004 or 1004 in a similar manner as described with respect to FIGS. 1 and 2. For example, the dimmer 1004 may correspond to the dimmer 104 of FIG. 1, and the dimmer 1006 may correspond to the dimmer 202 of FIG. 2.

In some example embodiments, each current source circuit 1016, 1018, 1020 may receive the voltage source signal from the voltage source circuit 1008 and generate a constant current DC signal that is provided to the respective light source of the respective light module 1010, 1012, 1014. The amplitude of the current provided by each current source circuit 1016, 1018, 1020 depends on the voltage level of the voltage source signal in a similar manner as described with respect to FIGS. 1 and 2. Because the amplitudes of the currents provided by the current source circuits 1016, 1018, 1020 depend on the voltage level of the voltage source signal, which depends on the dim level setting of the dimmer 1004 or the dimmer 1006, the dim/brightness level of the light emitted by the light sources of the lighting fixtures 1022, 1024, 1026 can be adjusted bay adjusting the dim level setting of the dimmer 1004 or the dimmer 1006. Because a voltage source circuit 1008 provides a constant voltage signal to the current source circuits 1016, 1018, 1020, a removal or malfunction of one of the light modules 1010, 1012, 1014 may not affect the operation of the remaining ones of the light modules 1010, 1012, 1014.

In some alternative embodiments, the system 1000 may include more or fewer than three lighting fixtures. In embodiments that include the line dimmer 1004, the dimmer 1006 may be omitted or unused. In embodiments that include the dimmer 1006, the line dimmer 1004 may be omitted or unused.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting fixture, comprising:
   a voltage source circuit;
   a first light module comprising a first current source circuit and a first light emitting diode (LED) light source; and
   a second light module comprising a second current source circuit and a second LED light source, wherein the voltage source circuit is configured to provide a voltage source output voltage to the first current source circuit and to the second current source circuit, wherein the first current source circuit is configured to provide a first current to the first LED light source, wherein the second current source circuit is configured to provide a second current to the second LED light source, wherein a first light provided by the first LED light source is fully dimmed when the first current has a minimum amplitude corresponding to a lower voltage level of the voltage source output voltage that is higher than zero volts and lower than an upper voltage limit of the voltage source output voltage, and wherein a second light provided by the second LED light source is fully dimmed when the second current has approximately the minimum amplitude.

2. The lighting fixture of claim 1, wherein a voltage level of the voltage source output voltage ranges between the upper voltage limit and the lower voltage level.

3. The lighting fixture of claim 2, wherein the lower voltage level is at least twenty percent of the upper voltage limit.

4. The lighting fixture of claim 2, wherein a line dimmer output voltage is provided by a phase-cut dimmer based on a dim level setting of the phase-cut dimmer.

5. The lighting fixture of claim 4, wherein the voltage source output voltage is at the upper voltage limit when the line dimmer output voltage has a minimum firing angle and wherein the voltage source output voltage is at the lower voltage level when the line dimmer output voltage has a maximum firing angle.

6. The lighting fixture of claim 2, wherein an amplitude of the first current and an amplitude of the second current depend on the voltage level of the voltage source output voltage.

7. The lighting fixture of claim 6, wherein the first current has a maximum amplitude when the voltage level of the voltage source output voltage equals the upper voltage limit.

8. The lighting fixture of claim 2, wherein the lower voltage level is at least fifty percent of the upper voltage limit.

9. The lighting fixture of claim 1, further comprising a third light module comprising:
   a third current source circuit; and
   a third LED light source, wherein the voltage source circuit is configured to provide the voltage source output voltage to the third current source circuit.

10. A lighting fixture, comprising:
   a voltage source circuit;
   a first light module comprising a first current source circuit and a first light emitting diode (LED) light source; and
   a second light module comprising a second current source circuit and a second LED light source, wherein the voltage source circuit is configured to provide a voltage source output voltage to the first current source circuit and to the second current source circuit, wherein the first current source circuit is configured to provide a first current to the first LED light source, wherein the second current source circuit is configured to provide a second current to the second LED light source, wherein a first light provided by the first LED light source is fully dimmed when the first current has a minimum amplitude corresponding a dimmest level indicated by a dim level control input provided to the voltage source circuit, and wherein a second light provided by the second LED light source is fully dimmed when an amplitude of the second current equals approximately the minimum amplitude.

11. The lighting fixture of claim 10, wherein a voltage level of the voltage source output voltage ranges between an upper voltage level and a lower voltage level and wherein the lower voltage level is higher than zero volts and lower than the upper voltage level.

12. The lighting fixture of claim 11, wherein the dim level control input is a control signal provided by a 0-10V dimmer based on a dim level setting of the 0-10V dimmer.

13. The lighting fixture of claim 11, wherein an amplitude of the first current and the amplitude of the second current depend on the voltage level of the voltage source output voltage.

14. The lighting fixture of claim 13, wherein the first current has a maximum amplitude when the voltage level of the voltage source output voltage equals the upper voltage level and wherein the voltage level of the voltage source output voltage equals the lower voltage level when the dim level control input provided to the voltage source circuit indicates the dimmest level indicated by the dim level control input.

15. The lighting fixture of claim 11, wherein the lower voltage level is at least fifty percent of the upper voltage level.

16. The lighting fixture of claim 10, further comprising a third light module comprising:
   a third current source circuit; and
   a third LED light source, wherein the voltage source circuit is configured to provide the voltage source output voltage to the third current source circuit.

17. A lighting system, comprising:
   a line dimmer; and
   a lighting fixture, comprising
      a voltage source circuit;
      a first light module comprising a first current source circuit and a first light emitting diode (LED) light source; and
      a second light module comprising a second current source circuit and a second LED light source, wherein the voltage source circuit is configured to provide a voltage source output voltage to the first current source circuit and to the second current source circuit, wherein the first current source circuit is configured to provide a first current to the first LED light source, wherein the second current source circuit is configured to provide a second current to the second LED light source, wherein a voltage level of the voltage source output voltage depends on a waveform of a line dimmer output voltage that is provided to the voltage source circuit by the line dimmer, wherein the first current source circuit includes a first potentiometer that is adjustable to adjust the first current based on the voltage level of the voltage source output voltage, and wherein the second current source circuit includes a second potentiometer that is adjustable to adjust the second current based on the voltage level of the voltage source output voltage.

18. The lighting system of claim 17, wherein the voltage level of the voltage source output voltage ranges between an upper voltage level and a lower voltage level and wherein the lower voltage level is higher than zero volts and lower than the upper voltage level.

19. The lighting system of claim 18, wherein the lower voltage level is at least fifty percent of the upper voltage level.

20. The lighting system of claim 17, wherein the voltage source output voltage is at the upper voltage level when the line dimmer output voltage has a minimum firing angle and wherein the voltage source output voltage is at the lower voltage level when the line dimmer output voltage has a maximum firing angle.

* * * * *